United States Patent
Viswanathan et al.

(10) Patent No.: US 8,688,620 B2
(45) Date of Patent: Apr. 1, 2014

(54) ANOMALY DETECTION IN DATA CENTERS

(75) Inventors: Krishnamurthy Viswanathan, Mountain View, CA (US); Choudur Lakshminarayan, Austin, TX (US); Vanish Talwar, Campbell, CA (US); Chengwei Wang, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/243,476

(22) Filed: Sep. 23, 2011

(65) Prior Publication Data

US 2013/0080375 A1    Mar. 28, 2013

(51) Int. Cl.
    *G06F 15/18*    (2006.01)
(52) U.S. Cl.
    USPC .......................................................... 706/62
(58) Field of Classification Search
    USPC .......................................................... 706/62
    See application file for complete search history.

(56) References Cited

U.S. PATENT DOCUMENTS

| | | | | |
|---|---|---|---|---|
| 8,027,897 | B2 * | 9/2011 | Lakshminarayan et al. | .... 705/35 |
| 8,037,178 | B1 * | 10/2011 | Agarwalla et al. | ............ 709/225 |
| 8,046,468 | B2 * | 10/2011 | Isci et al. | ...................... 709/226 |
| 8,115,151 | B2 * | 2/2012 | Wang | ........................ 250/203.4 |
| 8,180,693 | B2 * | 5/2012 | Lakshminarayan et al. | .... 705/35 |
| 8,180,694 | B2 * | 5/2012 | Lakshminarayan et al. | .... 705/35 |
| 8,185,913 | B1 * | 5/2012 | Talwar et al. | ................. 719/319 |
| 8,255,709 | B2 * | 8/2012 | McCarthy et al. | ............ 713/300 |
| 8,312,126 | B2 * | 11/2012 | Monchiero et al. | ........... 709/223 |
| 8,458,547 | B2 * | 6/2013 | Viswanathan et al. | ........ 714/746 |
| 8,463,784 | B1 * | 6/2013 | Bekkerman et al. | .......... 707/737 |
| 8,504,733 | B1 * | 8/2013 | Iyer et al. | ...................... 709/252 |
| 8,549,004 | B2 * | 10/2013 | Lakshminarayan et al. | .. 707/737 |
| 2012/0136909 | A1 * | 5/2012 | Wang et al. | ................... 708/204 |
| 2012/0209575 | A1 * | 8/2012 | Barbat et al. | ..................... 703/2 |

* cited by examiner

*Primary Examiner* — Michael B Holmes

(57) ABSTRACT

Systems and methods of anomaly detection in data centers. An example method may include analyzing time series data for the data center by testing statistical hypotheses. The method may also include constructing upper and lower bounds based on the statistical hypotheses. The method may also include flagging anomalies in the time series data falling outside of the upper and lower bounds.

18 Claims, 4 Drawing Sheets

ANOMALY DETECTION IN DATA CENTERS

BACKGROUND

The client/server computing environment continues to expand into web services (often referred to as "Web 2.0"), with the latest iteration of Internet supported programmatic access to services and data provided by data centers. Commercial data centers can be characterized by scale and complexity. By way of illustration, individual applications (e.g., Web 2.0 applications) may operate across thousands of servers. Utility clouds may serve more than two million enterprises, each with different workload characteristics. Accordingly, data center management is a difficult task, and failing to respond to malfunctions can lead to lost productivity and profits.

Anomaly detection deployed in many data centers compare metrics (which are being monitored in the data center) to fixed thresholds. These thresholds may be determined "offline," e.g., using training data, and tend to remain constant during the entire monitoring process. Static thresholds are invariant to changes in the statistical distributions of the metrics that occur over time due to man, material, machine, and processes. Thus, static thresholds do not adapt to intermittent bursts or workloads that change in nature over time. Static thresholds cannot be used to effectively identify anomalous behavior unless that behavior is considered extremely large or extremely small. These factors reduce accuracy and tend to cause false alarms.

Approaches such as Multivariate Adaptive Statistical Filtering (MASF) maintain a separate threshold for data segmented and aggregated by time (e.g., hour of day, day of week). However, these techniques assume a Gaussian data distribution for determining the thresholds. This assumption is frequently violated in practice.

Academic statistical techniques cannot be implemented at the scale of data centers and cloud computing systems, and do not work well in online environments because of the high computing overheads and use of very large amounts of raw metric information. In addition, these techniques typically need prior knowledge about the application service level objectives, service implementations, and request semantics. These techniques also tend to focus only on solving certain well-defined problems at specific levels of abstraction.

DETAILED DESCRIPTION

Anomaly detection may be used to understand if a system is behaving as expected or in ways that are unusual therefore and deserve further investigation and diagnosis. Online anomaly detection described herein, may be used in data center management to detect and quickly respond to actual or anticipated disruptions in service. In a data center, anomaly detection should be continuous (while the system is running) and at scale (for entire data centers).

The systems and methods disclosed herein are "lightweight" techniques that do not rely on fixed-threshold approaches. A new windowing-based approach can be applied to observe changes in the distribution of data. In an example, statistical techniques may be implemented for analyzing data for multi-tier web applications running on server class machines.

The systems and methods disclosed herein improve system performance and availability, and may be implemented as online, closed loop management solutions that detect problems, diagnose problems to determine potential remedies or mitigation methods, and trigger and carry out solutions. The systems and methods disclosed herein are adaptable by "learning" workload characteristics over time, improve accuracy and reduce false alarms. These techniques also meet projected scalability needs of future data centers, are applicable to multiple contexts of data (detecting contextual anomalies), and can be applied across multiple metrics in a wide variety of different types, sizes, and complexity of data centers.

Before continuing, it is noted that as used herein, the terms "includes" and "including" mean, but is not limited to, "includes" or "including" and "includes at least" or "including at least." The term "based on" means "based on" and "based at least in part on."

Figure 1:
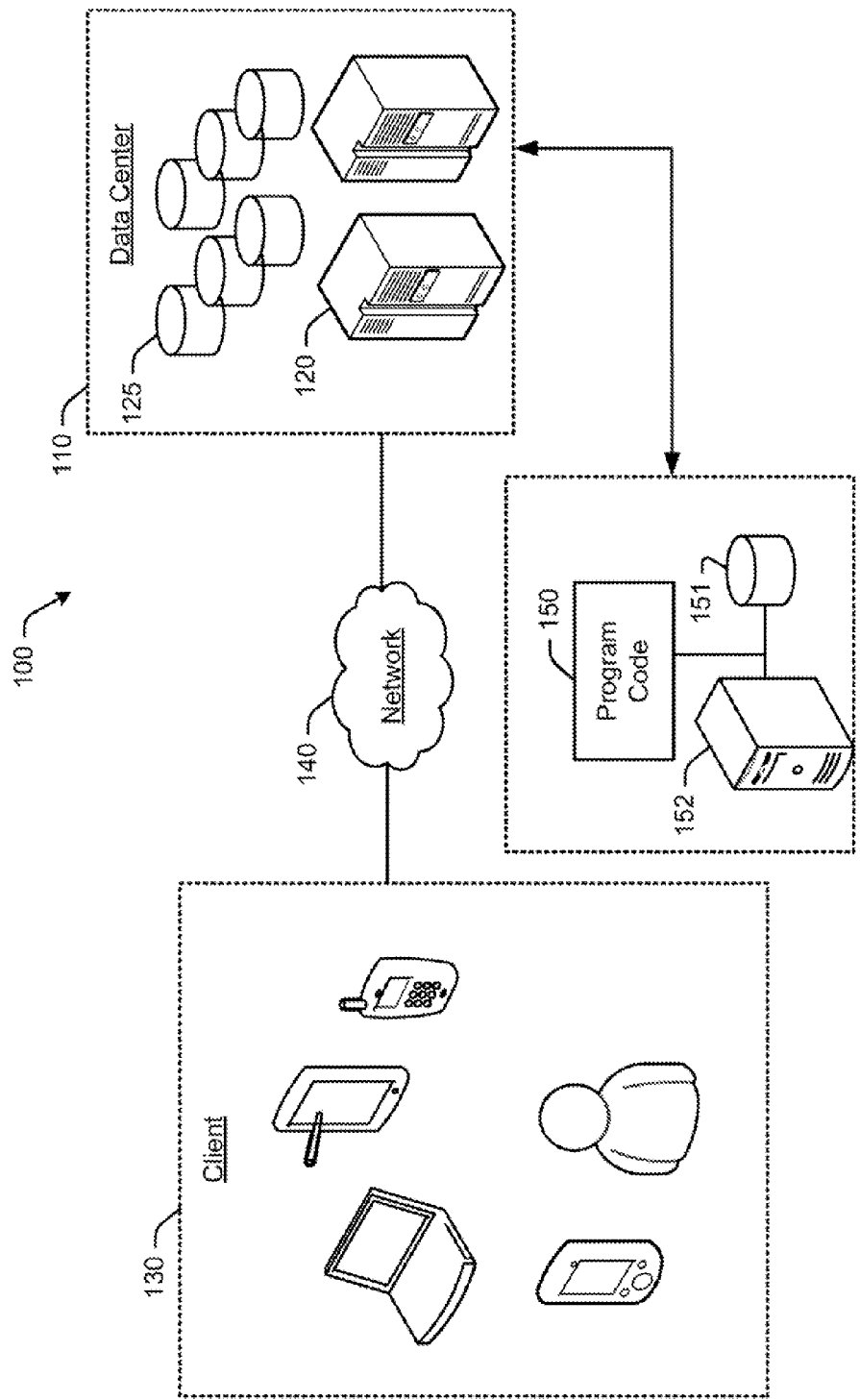
FIG. 1 is a high-level block diagram of an example networked computer system 100 in which anomaly detection may be implemented.

FIG. 1 is a high-level block diagram of an example networked computer system 100 in which anomaly detection may be implemented. System 100 may include a data center 110 having any of a wide variety of computing devices, such as, but not limited to, server computers (e.g., host 120), blade servers, data storage (e.g., storage network 125), networking devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices associated with the data center is also configured with sufficient computer readable storage and processing capability to execute program code for carrying out the anomaly detection techniques described herein.

In an example, the data center 110 may include at least one host 120 providing a service accessed by a user via a client device 130. For purposes of illustration, the service may be an online data processing service executing on host 120 configured as a server computer. Example services may include general purpose computing services (e.g., access to applications and application data hosted on the Internet or as dynamic data endpoints for any number of client applications). Services also include interfaces to application programming interfaces (APIs) and related support infrastructure which were previously the exclusive domain of desktop and local area network computing systems, such as application engines (e.g., word processing and graphics applications), and hosted business services (e.g., package delivery and tracking, online payment systems, and online retailers).

The client device 130 may be any suitable computer or computing device capable of accessing the host 120. Host 120 and client 130 are not limited to any particular type of devices. The system 100 may also include a communication network 140, such as a local area network (LAN) and/or wide area network (WAN). The host 120 and client 130 may be provided on the network 140 via a communication connection, such as via an Internet service provider (ISP). In this regard, the client 130 is able to access services provided in the data center in directly via the network 140, or via an agent, such as another network.

In an example, program code 150 may be implemented for monitoring the data center and detecting anomalies so that corrective action can be instituted so that the data center can provide the services to clients on a continuous or uninterrupted basis. For example, the service may be a cloud-based application service. Detecting anomalies in the data center may enable an administrator or monitoring service to proactively identify and remedy problems within the data center before those problems affect the ability of clients to access the cloud-based application service.

The program code 150 may be stored on computer-readable media 151 and executed by any suitable computing device 152. In an example, the program code may be implemented in machine-readable instructions (such as but not limited to, software or firmware). The machine-readable instructions may be stored on a non-transient computer readable medium and are executable by one or more processor to perform the operations described herein. It is noted, however, that the components shown in FIG. 1 are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. In an example, the architecture of machine readable instructions may be executed to detect anomalies in the data center.

Anomalies in data centers may manifest in a variety of different ways. In an example, an anomaly may manifest itself as a data point that is atypical with reference to the normal behavior of the data distribution. When an anomaly manifests as an atypical data point, the distribution of the data may be used to compute thresholds. Data under normal process behavior tends to oscillate within the threshold limits. Data points falling beyond and below the upper and lower thresholds, respectively, can be flagged as anomalies. These thresholds are based on assumptions about the behavior or shape of the distribution as well as a desired, false positive rate. An understanding and quantitative representation of the data distribution may be obtained by studying the historical data. This approach is known as parametric thresholding.

In another example, an anomaly may manifest itself when the distribution of data changes with time. The variability in the process over an extended period of time can be studied and analyzed using a historical data repository to estimate variability of the data, and characterize this variability and determine thresholds. This approach avoids having to make assumptions about the shape of distribution of the data. Such methods are known as non-parametric methods.

Online anomaly detection described herein computes statistics on data based on multiple time dimensions (e.g., entire past, recent past, and context based on hour of day, and day of week). These statistics are then employed to determine if specific points or windows in the data are anomalies. The algorithms have low complexity and are scalable to process large amounts of data.

The algorithms may be implemented or statistics may be employed for anomaly detection. An example is based on applying thresholds to individual data points. Another example involves measuring the change in distribution by windowing the data and using data within the window to determine anomalies.

A statistical analysis known as "Tukey" may be utilized for anomaly detection among individual data points. The Tukey method constructs a lower threshold and an upper threshold, where the thresholds are used to flag data as anomalous. The Tukey method does not make any distributional assumptions about the data.

The Tukey method is a simple, but effective procedure for identifying anomalies. For purposes of illustration, let $x_1$, $x_2, \ldots x_n$ be a series of observations, such as the processor utilization of a server. The data is arranged in an ascending order from the smallest to the largest observation. The ordered data is broken into four quarters, the boundary of each quarter defined by $Q_1$, $Q_2$, and $Q_3$, referred to herein as the "first quartile," "second quartile," and "third quartile," respectively. The difference $|Q_3-Q_1|$ is referred to as the "inter-quartile range."

The Tukey upper and lower thresholds for anomalies are: $|t|=Q_1-3|Q_3-Q_1|$ and $Q3+3|Q_3-Q|_1$ respectively. Observations falling outside these thresholds are referred to as "serious anomalies" and any observation, $x_i$, $i=1, 2, \ldots n$, such that $Q_3+1.5|Q_3-Q_1| \le x \le Q_3+3.0|Q_3-Q_1|$ is referred to as a "possible anomaly." Similarly, $Q_1-3.0|Q_3-Q_1| \le x \le Q_1-1.5|Q_3-Q_1|$ indicates a possible anomaly on the lower side. The method allows the user flexibility to set desired threshold limits. For example, depending on a user's experience, the upper and lower anomaly limits can be set to, $Q_3+k|Q_3-Q_1|$ and $Q_1-k|Q_3-Q_1|$, where k is an appropriately chosen scalar. The lower and upper Tukey limits correspond to a distance of 4.5 $\sigma$ (standard deviations) from the sample mean if the distribution of the data is Gaussian.

Windowing approaches identifying individual data points as anomalous can result in false alarms when, for example, sudden instantaneous spikes in processor or memory utilization are flagged. To avoid this, the windows of data including a collection of points can be examined to make a determination on the window. Thus, the point threshold approach can be extended to anomaly detection on windowed data by applying a threshold to the mean of the window of the data while making sure that the threshold takes into account the variance of the sample mean of the window. The thresholds can then be computed from the entire past history, or a subset of past windows. However, this approach may not capture all anomalies.

Instead, a new approach may be used to detect anomalies which manifest as changes in the system behavior that are inconsistent with what is expected. This approach is based on determining if the observed data is consistent with a given distribution. The hypothesis testing problem determines which of two hypotheses (e.g., the null hypothesis and the alternate hypothesis), best describes the data. The two hypotheses are each defined by a single distribution, or a collection of distributions. For purposes of illustration, let $X_1$, $X_2, \ldots X_n$ denote the observed sample of size n. Let $P_0$ denote the distribution representing the null-hypothesis, and let $P_1$ denote the distribution representing the alternate hypothesis. Then the optimal test for minimizing the probability of falsely rejecting the null hypothesis under a constraint on the probability of incorrectly accepting the null hypothesis is given by the Neyman-Pearson theorem. This theorem states that an optimal test is determining if the likelihood ratio:

$$\frac{P_0(X_1, X_2, \ldots X_n)}{P_1(X_1, X_2, \ldots X_n)} \ge T$$

In this inequality, $P_0(X_1, X_2, \ldots X_n)$ is the probability assigned to the observed sample under $P_0$, $P_1(X_1, X_2, \ldots X_n)$ is the corresponding probability assigned under $P_1$, and T is a threshold that can be determined based on the constraint on the probability of incorrectly accepting the null hypothesis. Selecting T is explained in more detail below.

It is noted that the alternate hypothesis may be the statement that the observed data is not drawn from the null hypothesis. Tests designed for this purpose are referred to as "goodness-of-fit" or likelihood ratio tests. Here, a particular test is invoked, known as the "multinomial goodness-of-fit" test, and is applied to a scenario where the data $X_i$ are discrete random variables that can take at most k values, for example $\{1, 2, \ldots k\}$.

For purposes of illustration, let $P_0 = (P_1, P_2, \ldots P_k)$, where $\Sigma_i p_i = 1$ denotes the distribution corresponding to the null hypothesis ($p_i$ denotes the probability of observing i). Further, let denote the number of times i was observed in the sample $X_1, X_2, \ldots X_n$, and let $\hat{p} = (\hat{p}_1, \hat{p}_2, \ldots \hat{p}_i)$, where $\hat{p}_i = n_i/n$ denotes the empirical distribution of the observed sample $X_1, X_2, \ldots X_n$. Then the logarithm of the likelihood ratio reduces to:

$$L = \log \frac{\prod_{i=1}^{k} \hat{p}_i^{n_i}}{\prod_{i=1}^{k} p_i^{n_i}} = n \sum_{i=1}^{n} \hat{p}_i \log \frac{\hat{p}_i}{p_i}$$

It is noted that the relative entropy (also known as the "Kullback-Leibler divergence") between two distributions $Q = (q_1, q_2, \ldots q_k)$ and $P = (p_1, p_2, \ldots p_k)$ is given by:

$$D(Q \| P) = \sum_i q_i \log \frac{q_i}{p_i}$$

Thus, the logarithm of the likelihood ratio is $L = n*D(\hat{P}\|P)$. The multinomial goodness-of-fit test is based on the observation that if the null hypothesis P is true, then as the number of samples n grows $2*n*D(\hat{P}\|P)$ converges to a chi-squared distribution with k−1 degrees of freedom. Therefore the test may be performed by comparing $2*n*D(\hat{P}\|P)$ with a threshold that is determined based on the cumulative distribution function (cdf) of the chi-squared distribution and a desired upper bound on the false negative probability. It is noted that the term "false positive" as used herein corresponds to the event where the true outcome is not an anomaly but the algorithm declares the outcome as an anomaly. More precisely, if f is the desired false positive probability, and $F_{\{k-1\}}(x)$ the cumulative distribution function of the chi-squared distribution with k−1 degrees of freedom, then we select the threshold T to be $T = \inf\{x: F_{\{k-1\}}(x) >= 1-f\}$, the value of x where $F_{\{k-1\}}(x)$ equals or is approximately 1-f.

To apply the multinomial goodness-of-fit test for the purpose of anomaly detection, the metric being measured is quantized and discretized to a few values. For example, the percentage of processor utilization (which takes values between 0 and 100) can be quantized into 10 buckets, each of width 10. Thus the quantized series of processor utilization values takes one of 10 different values. Then the data is windowed and anomaly detection is performed for each window. To do so, we select the quantized data observed in a window, decide on a choice of the null hypothesis P, and perform the multinomial goodness-of-fit test with a threshold based on an acceptable false negative probability. If the null hypothesis is rejected, then an alert is issued that the window contained an anomaly. If the null hypothesis is accepted, then the window is declared free of anomaly.

Depending on the choice of the null hypothesis, a variety of different tests can be implemented. In an example, an anomaly test may involve setting $P = (p_1, p_2, \ldots p_k)$, where $p_i$ is the fraction of times i appeared in the past (e.g., prior to the current window). This declares a window to be anomalous if the distribution of the metric values in that window differs significantly from the distribution of metric values in the past.

In another example, an anomaly test involves setting $p_i$ to be the fraction of times i appears in the past few windows. This choice declares a window to be anomalous if the distribution of the metric values in that window differs significantly from the distribution of metric values in the recent past. This distinguishes between cases where the distribution of the metric being monitored changes in a slow or gentle manner, and where the distribution of the metric changes abruptly.

It is noted that the nature of the workload on a data center is often inconsistent. For example, the data center workload may be strongly related to the day of the week, the hour of the day, and/or may vary based on other factors. Thus, applying the hypothesis tests as described above directly may not always yield the desired results. In such cases, the data may be put into context, e.g., by computing the null hypothesis based on the context (e.g., hour of day, day of the week, or other factor).

It is also noted that some data centers operate in multiple states. For example, the data center may encounter a very small or "no load" for most of the time being monitored, and then higher workloads in intermittent bursts. It is possible in these situations, that the relative entropy based approaches described above may flag the second state as anomalous. In these situations, an extension of the goodness-of-fit approach may be utilized. In an example of this extension, the test statistic is computed against several null hypotheses (instead of against only a single null hypothesis). Null hypotheses may be selected, and anomaly detection performed, using the following algorithm:

---

Algorithm ANOMALY DETECTION USING MULTINOMIAL GOODNESS-OF-FIT
Input: (Util, $N_{bins}$, $Util_{min}$, $Util_{max}$, n, W. T. $c_{th}$)

1) Set m = 0
2) Set $W_{index}$ = 1
3) Set Stepsize = ($Util_{max}$ − $Util_{min}$)/$N_{bins}$
4) While ($W_{index} * W < n$)
   a) Set $Util_{current}$ = Util(($W_{index}$ − 1)*W + 1 : $W_{index}$ * W)
   b) Set $B_{current}$ = $\lceil ((Util_{current} - Util_{min})/Stepsize) \rceil$
   c) Compute $\hat{P}$
   d) If m = 0
     • Set $P_1 = \hat{P}$, m = 1, $c_1$ = 1
   e) Else if $(2 * W * D(\hat{P}\|P_i) < T)$ for any hypothesis $P_i$, i ≤ m,
     • Increment $c_i$ by 1 (If more than one such i exists, select the one with lowest $D(\hat{P}\|P_i)$)
     • If $c_i > c_{th}$,
       - Declare window to be non-anomalous
     • Else
       - Declare window to be anomalous
   f) Else
     • Declare window to be anomalous
     • Increment m by 1. set $P_m = \hat{P}$. and $c_m$ = 1

---

Where inputs to the algorithm include:
Util is the timeseries of the metric on which the anomaly needs to be detected
$N_{bins}$ is the number of bins into which Util is to be quantized $Util_{min}$ and $Util_{max}$ are the minimum and maximum values that Util can take n is the length of the time series being monitored W is the window size T is the threshold against which the test statistic is compared. It is usually set to that point in the chi-squared cdf with $N_{bins}$-1 degrees of freedom that corresponds to 0.95 or 0.99.

$c_{th}$ is a threshold against which $c_i$ is compared to determine if a hypothesis has occurred frequently enough.

And intermediate variables include:

m tracks the current number of null hypothesis

Stepsize is the step size in time series quantization $Util_{current}$ is the current window of utilization values $B_{current}$ is the current window of bin values obtained by quantizing the utilization values $\hat{P}$. the empirical frequency of the current window based on $B_{current}$.

$c_i$ tracks the number of windows that agree with hypothesis $P_i$

The algorithm may be implemented to select a current window (Step 4a), quantize values in the window (Step 4b), and compute the empirical frequency $\hat{P}$ of the current window (Step 4c). It is noted that $P_1, P_2, \ldots P_m$ denote the m null hypotheses at any point in time. Next, a test-statistic involving $\hat{P}$ and each of the $P_i$s is computed and compared to the threshold T (Step 4e). If the test-statistic exceeds the threshold for all of the null-hypotheses, the window is declared anomalous, m is incremented by 1, and a new hypothesis is created based on the current window. If the smallest test-statistic is less than the threshold, but corresponds to a hypothesis that was accepted fewer than $c_{th}$ times in the past, then the window is declared anomalous, but the number of appearances of that hypothesis is incremented. If neither of the two conditions is satisfied, then the window is declared non-anomalous and the appropriate book-keeping is performed.

The relative entropy based method described above is non-parametric. That is, the approach does not assume a particular form for the distribution of the data. The method can be easily extended to handle multi-dimensional time-series, thereby incorporating correlation, and can be adapted to workloads with distribution that change over time. This provides a systematic approach (based on the cdf of the chi-squared distribution) to choose a threshold which can be used to raise alarms. The approach can also be implemented to detect anomalies in multiple operating states, and for detecting contextual anomalies.

The algorithm is computationally lightweight. That is, the computation overhead for the current window statistics is negligible. Updating quantities such as mean and standard deviation can be performed in linear time, and in an online manner using very little memory, as only the sum of the observed values and the sum of the squares of the observed values need to be maintained in memory. For example, quantiles are computed for the Tukey method, and the empirical frequency of previous windows is computed for the relative entropy method. These quantities can be computed in time linear in the input, and these quantities can be well-approximated in one pass using only limited memory, without having to store all the observed data points.

Before continuing, it is noted that the data may be pre-processed prior to analyzing the data using the anomaly detection techniques described herein. Pre-processing of data may include data cleansing to remove invalid and/or spurious data, as well as data smoothing using procedures such as moving average smoothing, Fourier transform, and/or the Wavelet transform, to name only a few examples.

The anomaly detection techniques described herein may be used to analyze monitoring data over historical periods to make decisions. The historical period may be the entire past of the workload operation, or may include recent past values (but not the entire past). In either case, the data may be organized based on continuous history over time, or may be segregated by context (e.g. hour of day, or day or week.) The historical period can affect the results of the anomaly detection algorithms. For example, these factors may affect the null hypotheses against which the current window is evaluated.

Several factors may play a role in selecting the appropriate historical period. For example, if the workload has a periodic behavior, then recent past values can give enough statistical significance. If the pattern is based on weekly or hourly behavior, then the data may be organized by context. If the workload is long running and has exhibited aperiodic behavior in the past, the entire past data can be used to "smooth" averages. If the workload has varying behavior that is time-dependent, or is originating from virtual machines that have been migrated or are subject to varying resource allocation in shared environments, then considering only recent windows can reduce or altogether eliminate noise from past variable behavior.

In enterprise environments with dedicated infrastructures, selecting the appropriate historical period and organization of data may be straightforward. However, in cloud and utility computing environments (with limited prior knowledge of workload behavior, high churn, and shared infrastructure for workloads), the most appropriate historical period and organization of data to choose can be challenging and expensive to determine at large scale. Instead, an alternate approach may be implemented, in which at any given time, the anomaly detection algorithm is run in multiple instances in parallel. Accordingly, each run can leverage data analyzed from a different historical period. The results from the individual runs can then be combined to provide insight and a system status indicator for the administrator.

Before continuing, it is noted that online anomaly detection described herein can be applied to continuous monitoring scenarios, and is not limited to static profiling or limited sets of historical data.

The algorithms discussed above were tested using two different types of actual data. The first data set included "injected" anomalies (so that the anomalies were known) in order to validate results returned by the algorithms. The second data set (discussed below) was collected from production data center.

Figure 2:
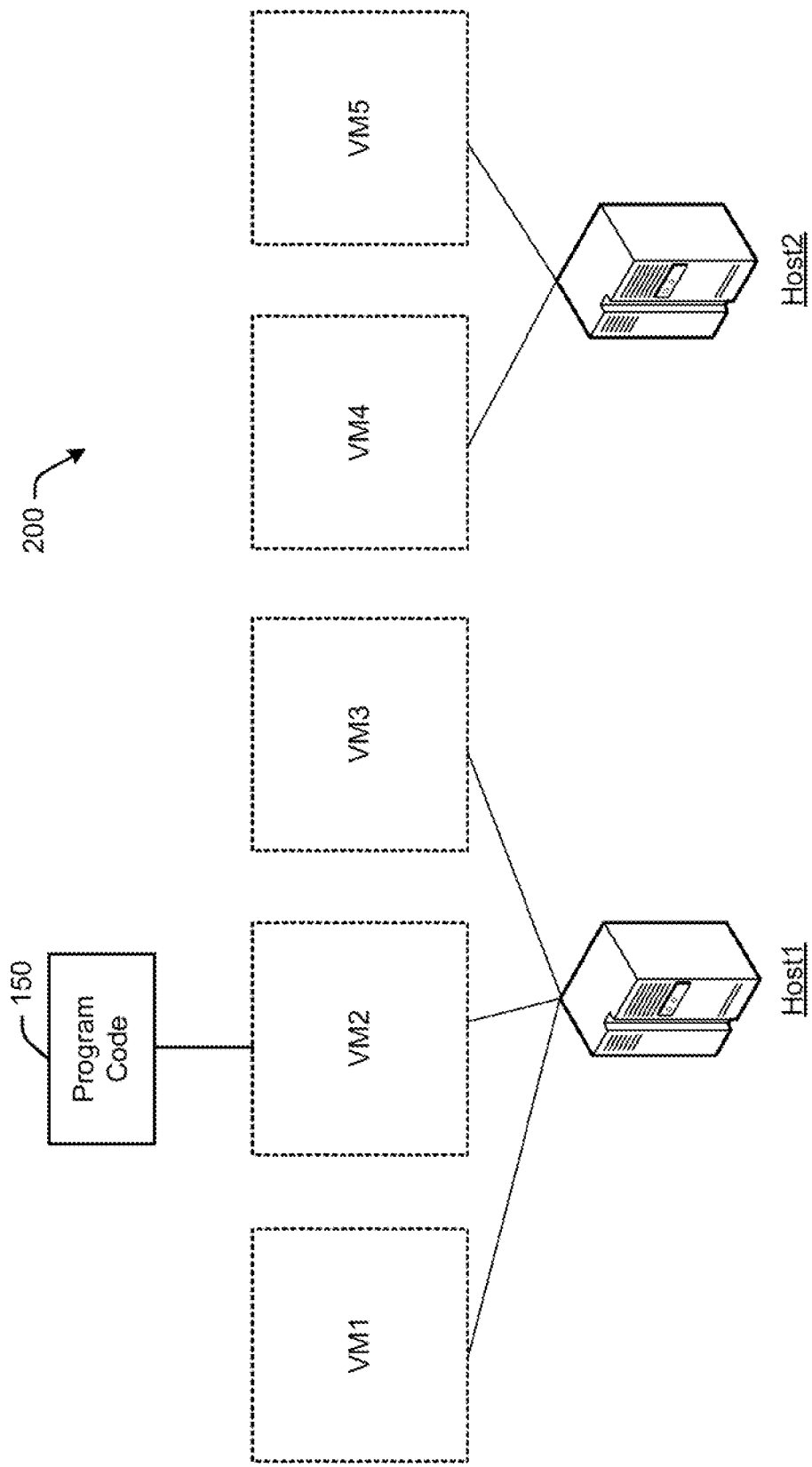
FIG. 2 is a high-level block diagram illustrating the experimental setup.

The first data set was collected using an experimental setup with a representative Internet service providing distributed online service implementing the core functionality of an auction site. FIG. 2 is a high-level block diagram illustrating the experimental setup 200. The experimental setup used five virtual machines (VM1 to VM5) on a Xen platform hosted on two physical servers (Host1 and Host2). VM1, VM2, and VM3 were created on Host1. The frontend server processed or redirected service requests runs in VM1. The application server handling the application logic 150 ran in VM2. The database backend server was deployed on VM3. The deployment was typical in its use of multiple VMs and the consolidation onto a smaller number of hosts.

A request load generator and an anomaly injector were running on two virtual machines (VM4 and VM5) on Host2. The generator created 10 hours of service request load for Host1, where the auction site resides. The load emulated concurrent clients, sessions, and human activities. During the experiment, the anomaly injector injected 50 anomalies into the online service in Host1. Those 50 anomalies were based on major sources of failures or performance issues in online services, and were injected using a uniform distribution. The virtual machine and host metrics were collected and analyzed in an anomaly detector.

Table 1 summarizes results from analyzing the processor utilizations, including recall and false positive rates (FPR) for the different techniques.

TABLE 1

| Method | Statistics Over | Recall | FPR |
|---|---|---|---|
| Gaussian (windowed) | Entire past | 0.06 | 0.02 |
| Gaussian (windowed) | Recent windows | 0.06 | 0.02 |
| Gaussian(smoothed) | Entire Past | 0.58 | 0.08 |
| Tukey(smoothed) | Entire Past | 0.76 | 0.04 |
| Relative entropy | Entire past | 0.46 | 0.04 |
| Relative entropy | Recent past | 0.74 | 0.04 |
| Relative entropy | Multiple Hypotheses | 0.86 | 0.04 |

It can be seen from the data in Table 1 that the typical statistical techniques perform poorly, as compared to the multiple hypotheses relative entropy technique described herein. That is, the CPU utilization data was quantized into 33 equally spaced bins, and for the windowing techniques, the window length was set to 100. For algorithms that use only the recent past, 10 windows of data were used. For the Gaussian methods, for each window, anomaly detection was performed on the CPU utilization of each of the three virtual servers and an alarm was raised only if an anomaly was detected in at least one server. For the relative entropy methods, the sum of the test statistics of each of the servers was compared to a threshold (computed based on the sum of chi-squared random variables being a chi-squared random variable). There were total 50 anomalies injected, and in our evaluation, an alarm was raised if an anomaly was detected in a window containing the anomaly.

The second data set was collected using two different "real-world" customer production data centers. Data was collected over a 30 and 60 day period for each customer (CUST1 and CUST2), respectively. Processor and memory utilization metrics were sampled every 5 minutes. The data was segmented by hour of day, and day of week for both CUST1 and CUST2, and then analyzed using anomaly detection methods.

Figure 3:
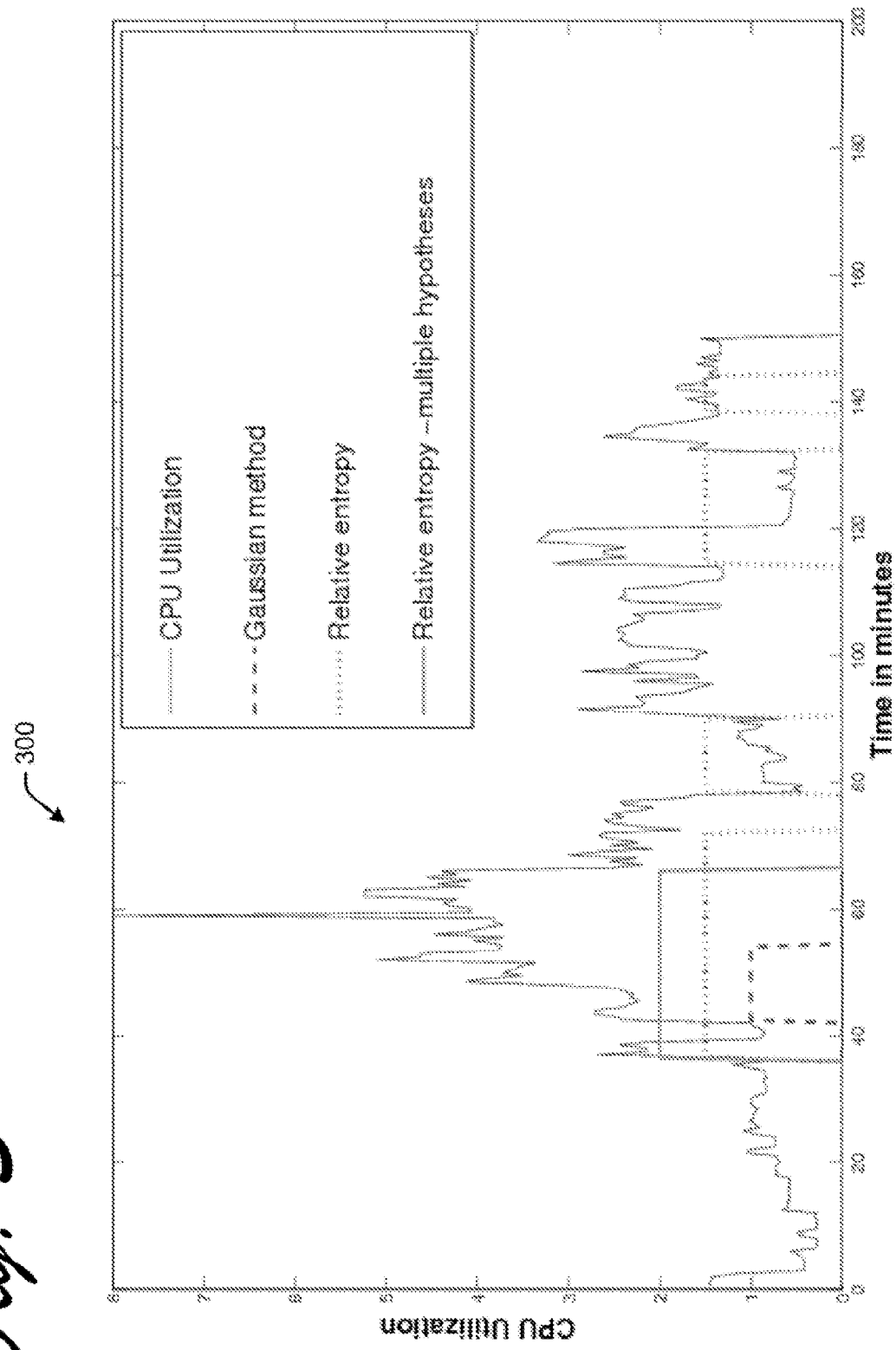
FIG. 3 is a representative plot of a windowed technique for anomaly detection using actual data.

FIG. 3 is a representative plot 300 of the windowed techniques on the data of one of the servers for CUST1, where the data was contextualized based on hour of day according to the techniques described above. The results are for a fixed hour during the day and for processor utilization data measured in terms of number of cores utilized and ranging from 0 to 8. In the plot, an alarm was raised when any of the curves is non-zero. It is observed that the multiple hypothesis technique described herein learns the behavior of the system and does not continue to raise alarms during similar subsequent increases.

The processor utilization of one of the servers was analyzed and interleaved according to hour of the day. More specifically, for each $x \in \{0, 1, 2, \ldots 23\}$, all the measurements made between x hours and x+1 hours on weekdays were grouped together. The pointwise Gaussian and Tukey techniques, and the relative entropy technique with multiple hypotheses, were tested. To determine the limits for the pointwise Gaussian and Tukey techniques, the first half of the data set was used to estimate the mean, standard deviation and relevant quantiles. The thresholds were applied on the second half of the data set to detect anomalies.

The server in question had been allocated a maximum of 16 cores and thus the values of CPU utilization ranged between 0.0 and 16.0. To apply the relative entropy detector, a bin width of 2.0 was used, corresponding to 8 bins. The window size was 12 data points, corresponding to an hour. Thus the relative entropy detector, at the end of each hour, declared that window to be anomalous or otherwise.

To facilitate a direct comparison, the alarms raised by the Gaussian and Tukey methods were processed as follows. For each of the techniques, if at least one alarm is raised within one window, then the window was deemed anomalous. This enabled direct comparison of the number of windows that each of the techniques flagged as anomalous. The comparison was performed for each of the 24 hours. The results are shown in Table 2.

TABLE 2

| Hour of day | # Anomalies (Relative Entropy-RE) | # Anomalies (Gaussian) | # Anomalies (Tukey) | Common Anomalies | Unique to RE | Unique to Gaussian | Unique to Tukey |
|---|---|---|---|---|---|---|---|
| 0000 | 6 | 7 | 7 | 6 | 0 | 0 | 0 |
| 0100 | 4 | 6 | 1 | 1 | 0 | 2 | 0 |
| 0200 | 2 | 4 | 0 | 0 | 0 | 2 | 0 |
| 0300 | 5 | 4 | 2 | 1 | 2 | 0 | 0 |
| 0400 | 5 | 5 | 2 | 2 | 0 | 0 | 0 |
| 0500 | 4 | 5 | 2 | 1 | 1 | 1 | 0 |
| 0600 | 5 | 7 | 3 | 3 | 0 | 2 | 0 |
| 0700 | 4 | 6 | 7 | 4 | 0 | 0 | 1 |
| 0800 | 6 | 2 | 3 | 2 | 3 | 0 | 0 |
| 0900 | 7 | 2 | 14 | 2 | 0 | 0 | 7 |
| 1000 | 6 | 2 | 13 | 2 | 0 | 0 | 7 |
| 1100 | 7 | 2 | 3 | 1 | 5 | 0 | 0 |
| 1200 | 4 | 2 | 2 | 2 | 2 | 0 | 0 |
| 1300 | 1 | 2 | 1 | 1 | 0 | 1 | 0 |
| 1400 | 5 | 5 | 5 | 4 | 1 | 0 | 0 |
| 1500 | 6 | 5 | 12 | 4 | 1 | 0 | 6 |
| 1600 | 4 | 5 | 2 | 2 | 1 | 2 | 0 |
| 1700 | 4 | 3 | 3 | 2 | 2 | 0 | 0 |
| 1800 | 4 | 3 | 0 | 0 | 1 | 0 | 0 |
| 1900 | 5 | 3 | 3 | 3 | 2 | 0 | 0 |
| 2000 | 3 | 2 | 0 | 0 | 2 | 1 | 0 |
| 2100 | 6 | 5 | 8 | 4 | 1 | 0 | 2 |
| 2200 | 5 | 4 | 0 | 0 | 2 | 1 | 0 |
| 2300 | 6 | 10 | 6 | 5 | 0 | 3 | 0 |

The first column in Table 2 shows the hour of day that was analyzed. The next three columns indicate number of anomalies detected by the three techniques. The fifth column shows the number of anomalies detected by all techniques, and the sixth, seventh and eighth columns show the anomalies that were uniquely detected by each of the techniques. To illustrate, the sixth column shows the number of anomalies detected by the relative entropy technique, but not by the other two. In most cases, the relative entropy technique shows the number of anomalies detected using the other two techniques, and also flags a few more anomalies.

There are three notable exceptions (hours 0900, 1000 and 1500) where the Tukey method flagged more anomalies than the other techniques. A closer examination of the data corresponding to these hours reveals that the processor utilization during these hours was very low (<0.5), causing the interquartile range to be very small and therefore resulting in a very low upper threshold. As a result, the algorithm flagged a large number of windows as anomalous, and it is reasonable to surmise that some of these may be false alarms. The data corresponding to hour 1100 resulted in the relative entropy technique returning 5 anomalies that the other two techniques did not flag.

The typical behavior of the CPU utilization hovered between 0.0 and 2.0 with occasional spikes. But often after spiking to a value greater than 6.0 for a few measurements, usage dropped back down to a value around 2.0. But in a couple of cases, the value did not drop down entirely and remained between 4.0 and 6.0, indicating perhaps a stuck thread. The Gaussian and Tukey methods do not catch this anomaly, because the data did not manifest as an extreme value. However, the relative entropy technique described herein did identify this anomaly.

It can be seen from the above examples that the systems and methods of anomaly detection described herein are "lightweight," both in terms of the number of metrics to run (e.g., the volume of monitoring data continuously captured and used), and in terms of runtime complexity for executing the detection. Online anomaly detection described herein can be used to handle multiple metrics at the different level of abstraction that are present in data centers (e.g., hardware, system software, middleware, or application). Furthermore, the methods accommodate workload characteristics and patterns, including but not limited to, day of the week, hour of the day, and patterns in the workload behavior. The methods can be implemented in the dynamic nature of data center environments, including dealing with application arrivals and departures, changes in workload, and system-level load balancing through, e.g., virtual machine migration. In addition, the techniques exhibit high accuracy and a low false alarm rate.

Before continuing, it should be noted that the examples described above are provided for purposes of illustration, and are not intended to be limiting.

Figure 4:
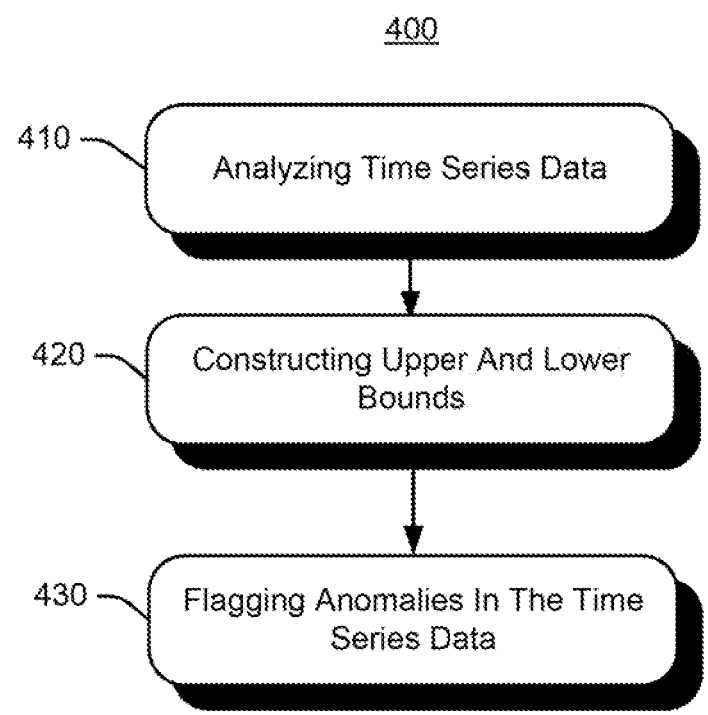
FIG. 4 is a flowchart illustrating example operations which may be implemented for anomaly detection in data centers.

FIG. 4 is a flowchart illustrating example operations which may be implemented for anomaly detection in data centers. Operations 400 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 410 includes analyzing time series data for the data center by testing statistical hypotheses. The statistical hypotheses correspond to different operational states of the data center. Operation 420 includes constructing upper and lower bounds based on the statistical hypotheses. Operation 430 includes flagging anomalies in the time series data falling outside of the upper and lower bounds.

The operations shown and described herein are provided to illustrate example implementations. It is noted that the operations are not limited to the ordering shown. Still other operations may also be implemented.

Further operations may include applying a multinomial goodness-of-fit test. This operation may include quantizing a metric being measured in the time series data and discretizing the metric to a few values, and windowing the time series data and analyzing each window for anomalies. Analyzing each window may include selecting the quantized data in a window, selecting a hypothesis, and performing the multinomial goodness-of-fit test with a threshold based on an acceptable false negative probability.

Further operations may also include raising an alarm that the window includes an anomaly if the hypothesis is rejected, and declaring that the window does not include an anomaly if the hypothesis is accepted.

Still further operations may include distinguishing between gentle changes in distribution of a monitored metric and abrupt changes in distribution of the monitored metric. Operations may include declaring a window to be anomalous if distribution of metric values in a window differs significantly from distribution of historical metric values.

Yet further operations may include contextualizing the time series data to factor changing load on the data center, and computing a test statistic against several null hypotheses to factor multiple states of operation of the data center.

The operations may be implemented at least in part using an end-user interface (e.g., web-based interface). In an example, the end-user is able to make predetermined selections, and the operations described above are implemented on a back-end device to present results to a user. The user can then make further selections. It is also noted that the various of the operations described herein may be automated or partially automated.

It is noted that the examples shown and described are provided for purposes of illustration and are not intended to be limiting. Still other examples are also contemplated.

The invention claimed is:

1. A method of anomaly detection in data centers, comprising:
    analyzing time series data for the data center by testing statistical hypotheses corresponding to different operational states of the data center;
    constructing upper and lower bounds based on the statistical hypotheses; and
    flagging anomalies in the time series data falling outside of the upper and lower bounds.

2. The method of claim 1, further comprising applying a multinomial goodness-of-fit test.

3. The method of claim 2, further comprising quantizing a metric being measured in the time series data and discretizing the metric to a few values.

4. The method of claim 3, further comprising windowing the time series data and analyzing each window for anomalies, and wherein analyzing each window further comprises:
    selecting the quantized data in a window selecting a hypothesis; and
    performing the multinomial goodness-of-fit test with a threshold based on an acceptable false negative probability.

5. The method of claim 3, wherein the multinomial goodness-of-fit test is based on relative entropy analysis.

6. The method of claim 5, further comprising raising an alarm that the window includes an anomaly if the hypothesis is rejected.

7. The method of claim 5, further comprising declaring that the window does not include an anomaly if the hypothesis is accepted.

8. The method of claim 1, further comprising distinguishing between gentle and abrupt changes in distribution of a monitored metric.

9. The method of claim 8, further comprising declaring a window to be anomalous if distribution of metric values in a window differs significantly from distribution of historical metric values.

10. The method of claim 1, further comprising contextualizing the time series data to factor changing load on the data center.

11. The method of claim 1, further comprising computing a test statistic against several null hypotheses to factor multiple states of operation of the data center.

12. A system for anomaly detection in data centers, the system comprising program code stored on non-transient computer-readable media and executable by a processor to:
   analyze time series data by testing statistical hypotheses corresponding to different operational states of the data center;
   construct upper and lower bounds based on the statistical hypotheses; and
   flag anomalies in the time series data based on the upper and lower bounds.

13. The system of claim 12, wherein the processor is executable to further distinguish between gentle changes in distribution of a monitored metric and abrupt changes in distribution of the monitored metric.

14. The system of claim 12, wherein the processor is executable to further contextualize the time series data to factor changing load on the data center.

15. The system of claim 12, wherein the processor is executable to further compute a test statistic against several null hypotheses to factor multiple states of operation of the data center.

16. The system of claim 12, wherein the processor is executable to further compute statistics for a current window and update historical statistics.

17. The system of claim 12, wherein the processor is executable online, using limited memory.

18. The system of claim 12, wherein processor is executable to compute a relative entropy using multiple hypotheses.

* * * * *

UNITED STATES PATENT AND TRADEMARK OFFICE
CERTIFICATE OF CORRECTION

PATENT NO. : 8,688,620 B2
APPLICATION NO. : 13/243476
DATED : April 1, 2014
INVENTOR(S) : Krishnamurthy Viswanathan et al.

Page 1 of 1

It is certified that error appears in the above-identified patent and that said Letters Patent is hereby corrected as shown below:

In the Claims

In column 12, line 61, in Claim 4, delete "window" and insert -- window; --, therefor.

In column 14, line 22, in Claim 18, before "processor" insert -- the --.

Signed and Sealed this
Fifteenth Day of July, 2014

Michelle K. Lee
*Deputy Director of the United States Patent and Trademark Office*